United States Patent
Akkarakaran et al.

(10) Patent No.: US 11,632,687 B2
(45) Date of Patent: Apr. 18, 2023

(54) POSITIONING MEASUREMENT DATA

(71) Applicant: QUALCOMM Incorporated, San Diego, CA (US)

(72) Inventors: Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 181 days.

(21) Appl. No.: 17/157,040

(22) Filed: Jan. 25, 2021

(65) Prior Publication Data

US 2021/0235303 A1 Jul. 29, 2021

Related U.S. Application Data

(60) Provisional application No. 62/966,522, filed on Jan. 27, 2020.

(51) Int. Cl.
| | |
|---|---|
| *H04W 4/00* | (2018.01) |
| *H04W 24/10* | (2009.01) |
| *H04L 5/00* | (2006.01) |
| *H04W 92/18* | (2009.01) |

(52) U.S. Cl.
CPC ........... *H04W 24/10* (2013.01); *H04L 5/0048* (2013.01); *H04W 92/18* (2013.01)

(58) Field of Classification Search
CPC ....... H04W 24/10; H04W 92/18; H04W 4/02; H04L 5/0048; G01S 5/0072; G01S 5/0236; G01S 2205/008
USPC .......................................................... 370/329
See application file for complete search history.

(56) References Cited

U.S. PATENT DOCUMENTS

| | | | |
|---|---|---|---|
| 10,484,890 B2* | 11/2019 | Lin | H04W 72/04 |
| 11,444,734 B2* | 9/2022 | Manolakos | H04W 72/0413 |
| 2012/0040696 A1* | 2/2012 | Siomina | G01S 5/0036 |
| | | | 455/456.6 |
| 2016/0095131 A1* | 3/2016 | Seo | H04W 72/0413 |
| | | | 370/329 |
| 2017/0111880 A1 | 4/2017 | Park et al. | |

(Continued)

FOREIGN PATENT DOCUMENTS

| | | | | |
|---|---|---|---|---|
| CN | 104160642 A | * | 11/2014 | G01S 5/021 |
| WO | 2019004727 A1 | | 1/2019 | |

OTHER PUBLICATIONS

International Search Report and Written Opinion—PCT/US2021/015028—ISA/EPO—dated Apr. 30, 2021.

(Continued)

*Primary Examiner* — Maharishi V Khirodhar
(74) *Attorney, Agent, or Firm* — Thien T. Nguyen

(57) ABSTRACT

Disclosed are techniques for wireless communication. In an aspect, a first communication node (e.g., UE, BS, etc.) obtains one or more measurements associated with one or more PRSs (e.g., uplink PRS(s), downlink PRS(s), etc.) The first communication node populates measurement value(s) into measurement field(s) of a report based on the one or more measurements. The first communication node identifies at least one unpopulated measurement field associated with the report, and transmits, to a second communication node, the report in association with an indication of the at least one unpopulated measurement field. The second communication node (e.g., UE, BS, etc.) performs position computing function based on the report.

44 Claims, 11 Drawing Sheets

(56) References Cited

U.S. PATENT DOCUMENTS

| | | |
|---|---|---|
| 2018/0199306 A1 | 7/2018 | Edge et al. |
| 2019/0380056 A1 | 12/2019 | Lee et al. |
| 2020/0267684 A1* | 8/2020 | Huang .................. H04L 5/0051 |
| 2021/0014644 A1* | 1/2021 | Wu ......................... H04W 4/70 |
| 2021/0377774 A1* | 12/2021 | Yu ........................ H04B 7/0695 |

OTHER PUBLICATIONS

Qualcomm Incorporated: "Combined Downlink and UplinK NR Positioning Procedures", 3GPP Draft, 3GPPTSG-RAN WG2 Meeting #104, R2-1817899, (Positioning Procedures), 3rd Generation Partnership Project (3GPP), Mobile Competence Centre, 650, Route Des Lucioles, F-06921 Sophia-Antipolis Cedex, France, vol. RAN WG2, No. Spokane, USA, Nov. 12, 2018-Nov. 16, 2018, Nov. 2, 2018 (Nov. 2, 2018), XP051481785, pp. 1-18, Retrieved from the Internet: URL: https://www.3gpp.org/ftp/tsg_ran/wg2_rl2/TSGR2_104/Docs/R2-1817899.zip [retrieved on Nov. 2, 2018].

* cited by examiner

POSITIONING MEASUREMENT DATA

CROSS-REFERENCE TO RELATED APPLICATION

The present Application for Patent claims the benefit of U.S. Provisional Application No. 62/966,522, entitled "POSITIONING MEASUREMENT DATA", filed Jan. 27, 2020, assigned to the assignee hereof and hereby expressly incorporated by reference herein in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., LTE or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

An aspect is directed to a method of operating a first communication node, comprising obtaining one or more measurements associated with one or more positioning reference signals (PRSs), populating a set of measurement values into a set of measurement fields of a report based on the one or more measurements, identifying at least one unpopulated measurement field associated with the report, and transmitting, to a second communication node, the report in association with an indication of the at least one unpopulated measurement field.

Another aspect is directed to a method of operating a second communication node, comprising receiving, from a first communication node, a report comprising a set of measurement values populated in a respective set of measurement fields, the set of measurement values based on one or more measurements associated with one or more positioning reference signals (PRSs), receiving an indication of at least one unpopulated measurement field associated with the report, and performing a position computing function based on the report.

Another aspect is directed to a first communication node, comprising a memory, at least one transceiver, and at least one processor communicatively coupled to the memory and the at least one transceiver, the at least one processor configured to obtain one or more measurements associated with one or more positioning reference signals (PRSs), populate a set of measurement values into a set of measurement fields of a report based on the one or more measurements, identify at least one unpopulated measurement field associated with the report, and transmit, to a second communication node, the report in association with an indication of the at least one unpopulated measurement field.

Another aspect is directed to a second communication node, comprising a memory, at least one transceiver, and at least one processor communicatively coupled to the memory and the at least one transceiver, the at least one processor configured to receive, from a first communication node, a report comprising a set of measurement values populated in a respective set of measurement fields, the set of measurement values based on one or more measurements associated with one or more positioning reference signals (PRSs), receive an indication of at least one unpopulated measurement field associated with the report, and perform a position computing function based on the report.

Another aspect is directed to a first communication node, comprising means for obtaining one or more measurements associated with one or more positioning reference signals (PRSs), means for populating a set of measurement values into a set of measurement fields of a report based on the one or more measurements, means for identifying at least one unpopulated measurement field associated with the report, and means for transmitting, to a second communication node, the report in association with an indication of the at least one unpopulated measurement field.

Another aspect is directed to a second communication node, comprising means for receiving, from a first communication node, a report comprising a set of measurement values populated in a respective set of measurement fields, the set of measurement values based on one or more measurements associated with one or more positioning reference signals (PRSs), means for receiving an indication of at least one unpopulated measurement field associated with the report, and means for performing a position computing function based on the report.

Another aspect is directed to a non-transitory computer-readable medium storing computer-executable instructions, the computer-executable instructions comprising at least one instruction instructing a first communication node to obtain one or more measurements associated with one or more positioning reference signals (PRSs), at least one instruction instructing the first communication node to populate a set of measurement values into a set of measurement fields of a report based on the one or more measurements, at least one instruction instructing the first communication node to identify at least one unpopulated measurement field associated with the report, and at least one instruction instructing the first communication node to transmit, to a second communication node, the report in association with an indication of the at least one unpopulated measurement field.

Another aspect is directed to a non-transitory computer-readable medium storing computer-executable instructions, the computer-executable instructions comprising at least one instruction instructing a second communication node to receive, from a first communication node, a report comprising a set of measurement values populated in a respective set of measurement fields, the set of measurement values based on one or more measurements associated with one or more positioning reference signals (PRSs), at least one instruction instructing the second communication node to receive an indication of at least one unpopulated measurement field associated with the report, and at least one instruction instructing the second communication node to perform a position computing function based on the report.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
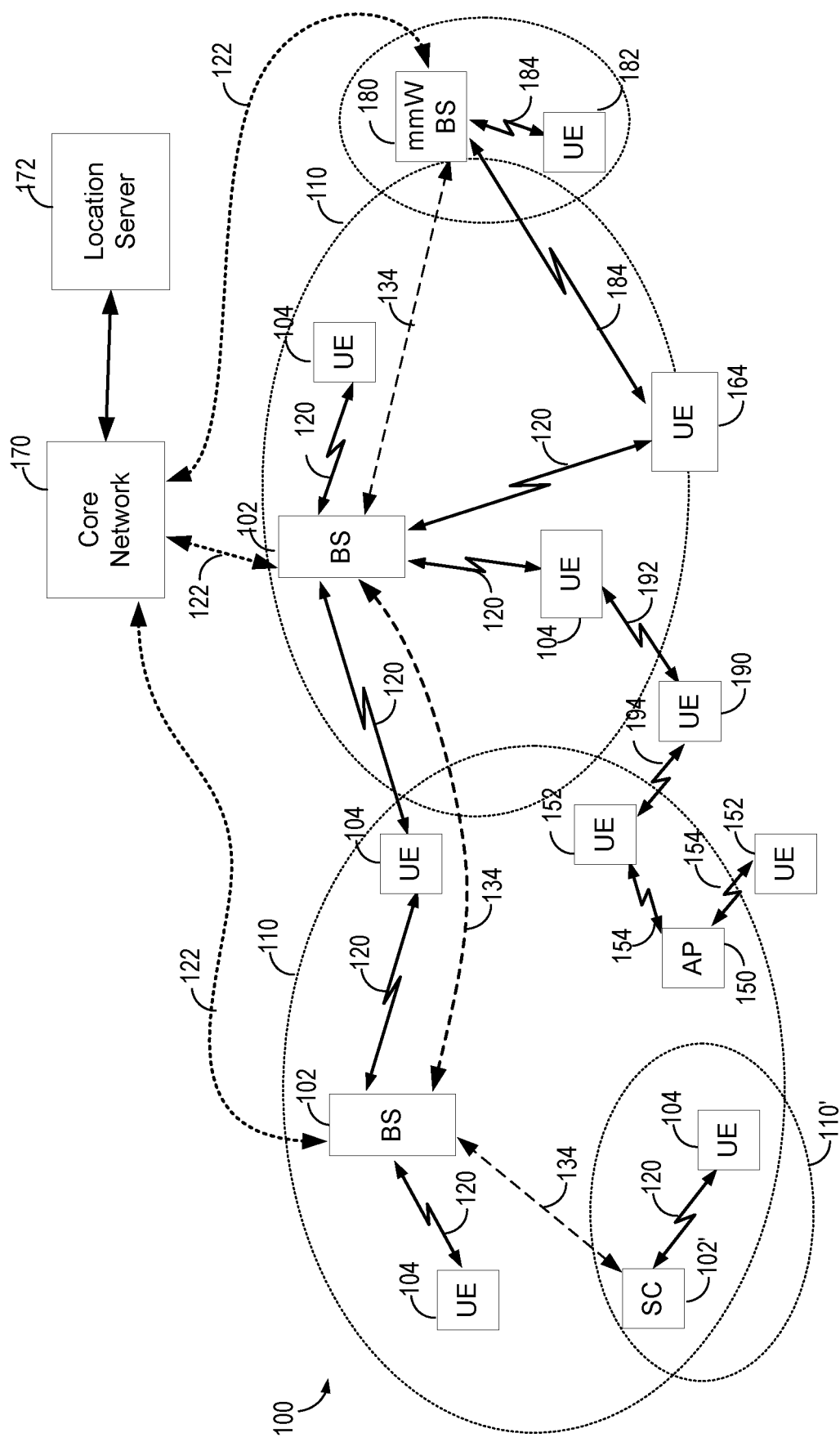
FIG. 1 illustrates an exemplary wireless communications system, according to various aspects.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
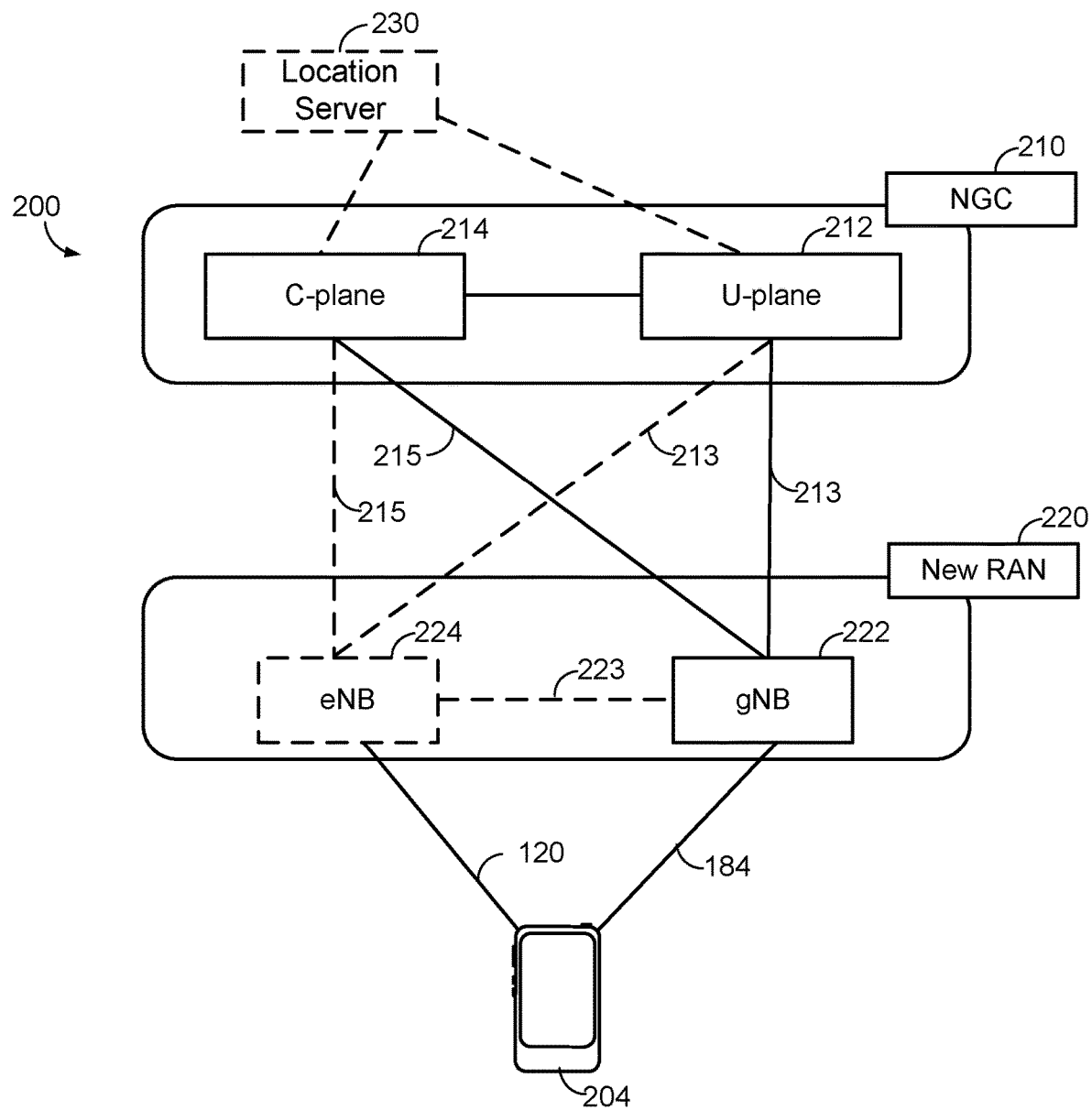
FIGS. 2A and 2B illustrate example wireless network structures, according to various aspects.

According to various aspects, FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
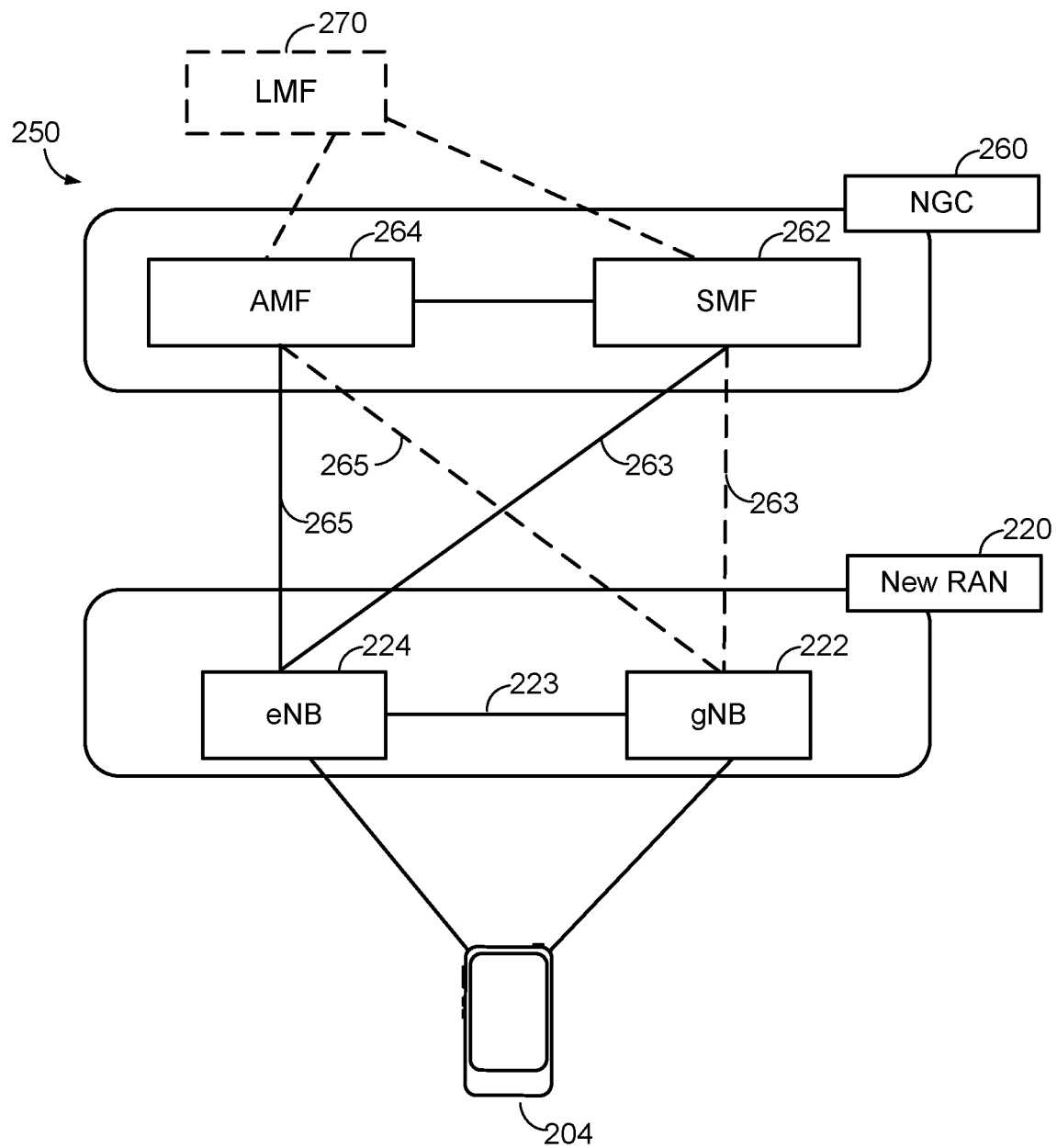

According to various aspects, FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE

204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3A:
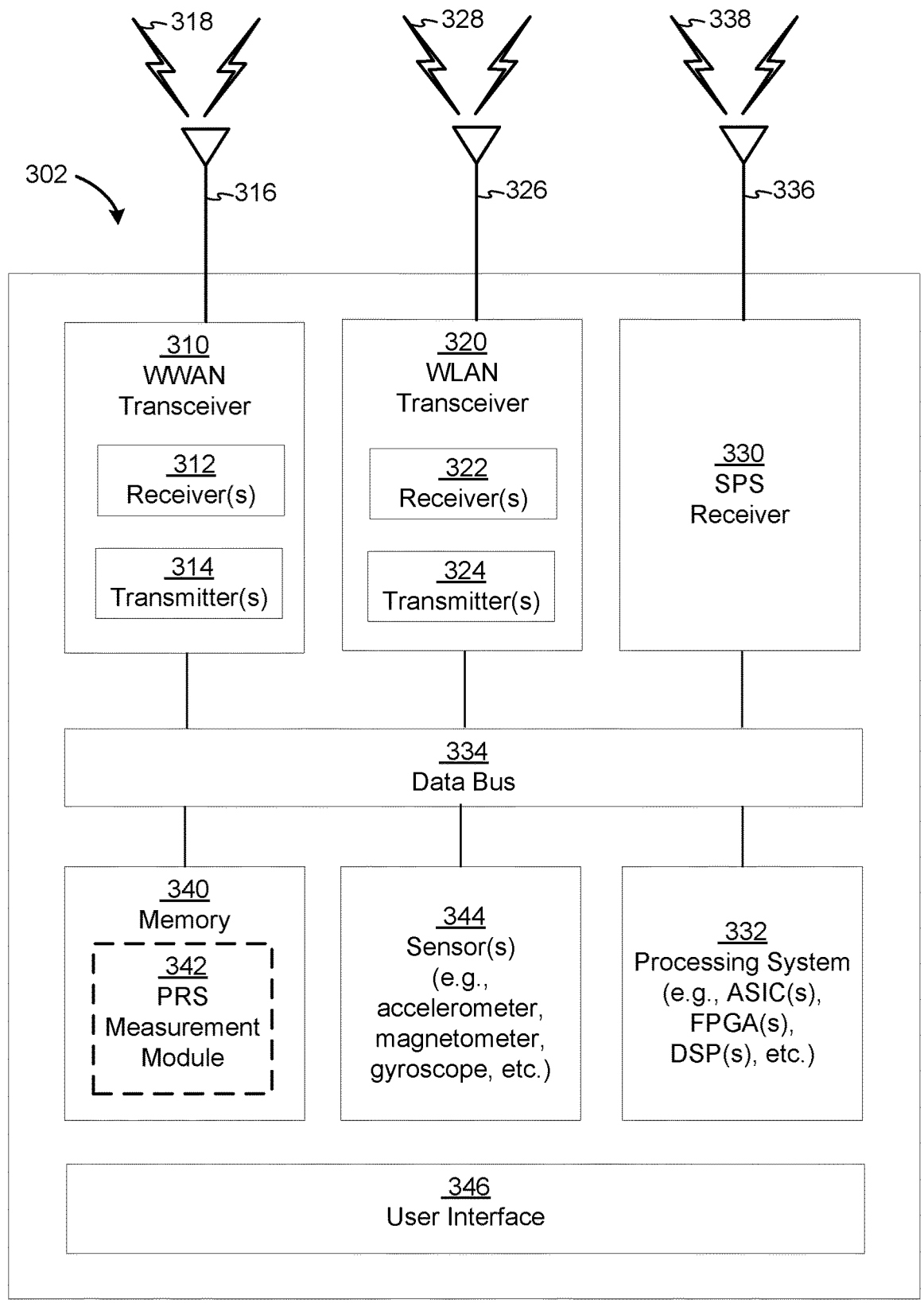
FIGS. 3A to 3C are simplified block diagrams of several sample aspects of components that may be employed in wireless communication nodes and configured to support communication as taught herein.
Figure 3B:
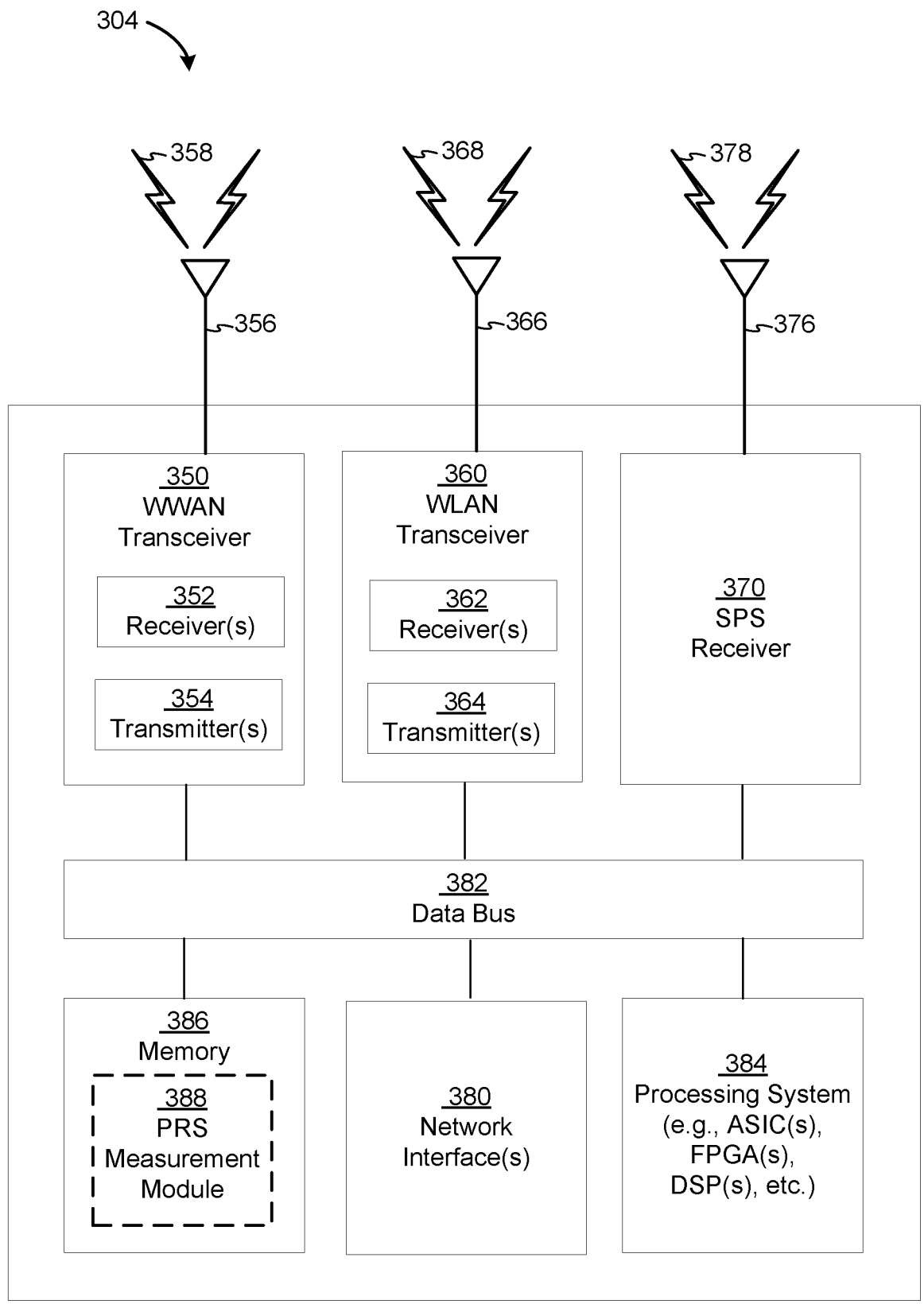
Figure 3C:
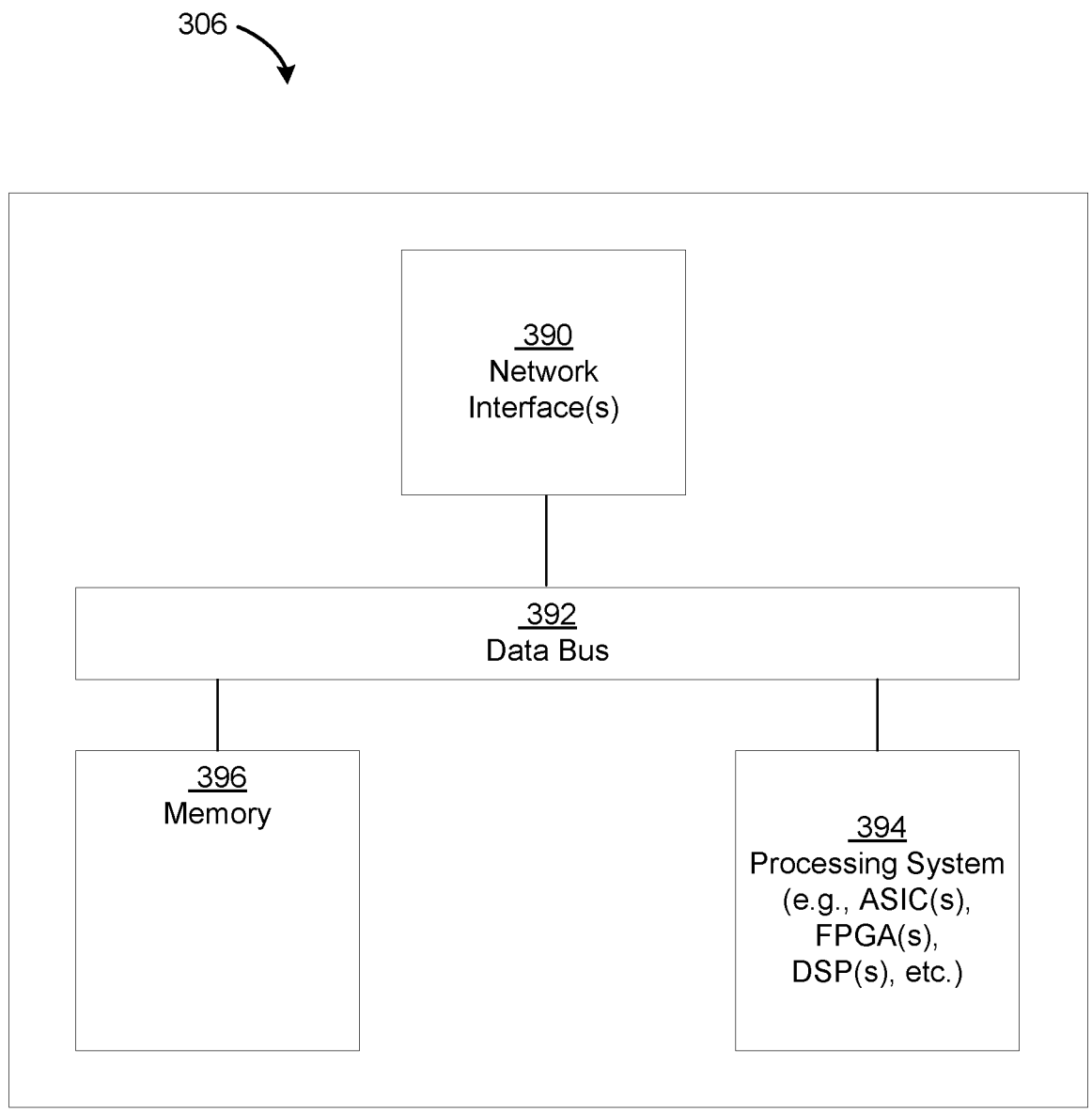

FIGS. 3A, 3B, and 3C illustrate several sample components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including a transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 336, and 376), such as an antenna array, that permits the respective apparatus to perform transmit "beamforming," as described herein. Similarly, a receiver may include or be coupled to a plurality of antennas (e.g., antennas 316, 336, and 376), such as an antenna array, that permits the respective apparatus to perform receive beamforming, as described herein. In an aspect, the transmitter and receiver may share the same plurality of antennas (e.g., antennas 316, 336, and 376), such that the respective apparatus can only receive or transmit at a given time, not both at the same time. A wireless communication device (e.g., one or both of the transceivers 310 and 320 and/or 350 and 360) of the apparatuses 302 and/or 304 may also comprise a network listen module (NLM) or the like for performing various measurements.

The apparatuses 302 and 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine the apparatus' 302 and 304 positions using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving: messages, parameters, or other types of information.

The apparatuses 302, 304, and 306 also include other components that may be used in conjunction with the operations as disclosed herein. The UE 302 includes processor circuitry implementing a processing system 332 for providing functionality relating to, for example, false base station (FBS) detection as disclosed herein and for providing other processing functionality. The base station 304 includes a processing system 384 for providing functionality relating to, for example, FBS detection as disclosed herein and for providing other processing functionality. The network entity 306 includes a processing system 394 for providing functionality relating to, for example, FBS detection as disclosed herein and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The apparatuses 302, 304, and 306 include memory circuitry implementing memory components 340, 386, and 396 (e.g., each including a memory device), respectively, for maintaining information (e.g., information indicative of reserved resources, thresholds, parameters, and so on). In some cases, the apparatuses 302, 304, and 306 may include PRS measurement modules 342 and 388, respectively. The PRS measurement modules 342 and 388 may be hardware circuits that are part of or coupled to the processing systems 332, 384, and 394, respectively, that, when executed, cause the apparatuses 302, 304, and 306 to perform the functionality described herein. Alternatively, the PRS measurement modules 342 and 388 may be memory modules (as shown in FIGS. 3A-C) stored in the memory components 340, 386, and 396, respectively, that, when executed by the processing systems 332, 384, and 394, cause the apparatuses 302, 304, and 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the GPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the apparatuses 304 and 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the UL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the DL transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The UL transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the UL, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the apparatuses 302, 304, and/or 306 are shown in FIGS. 3A-C as including various components that may be configured according to the various examples described herein. It will be appreciated, however, that the illustrated blocks may have different functionality in different designs.

The various components of the apparatuses 302, 304, and 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 396 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the PRS measurement modules 342 and 388, etc.

Figure 4A:
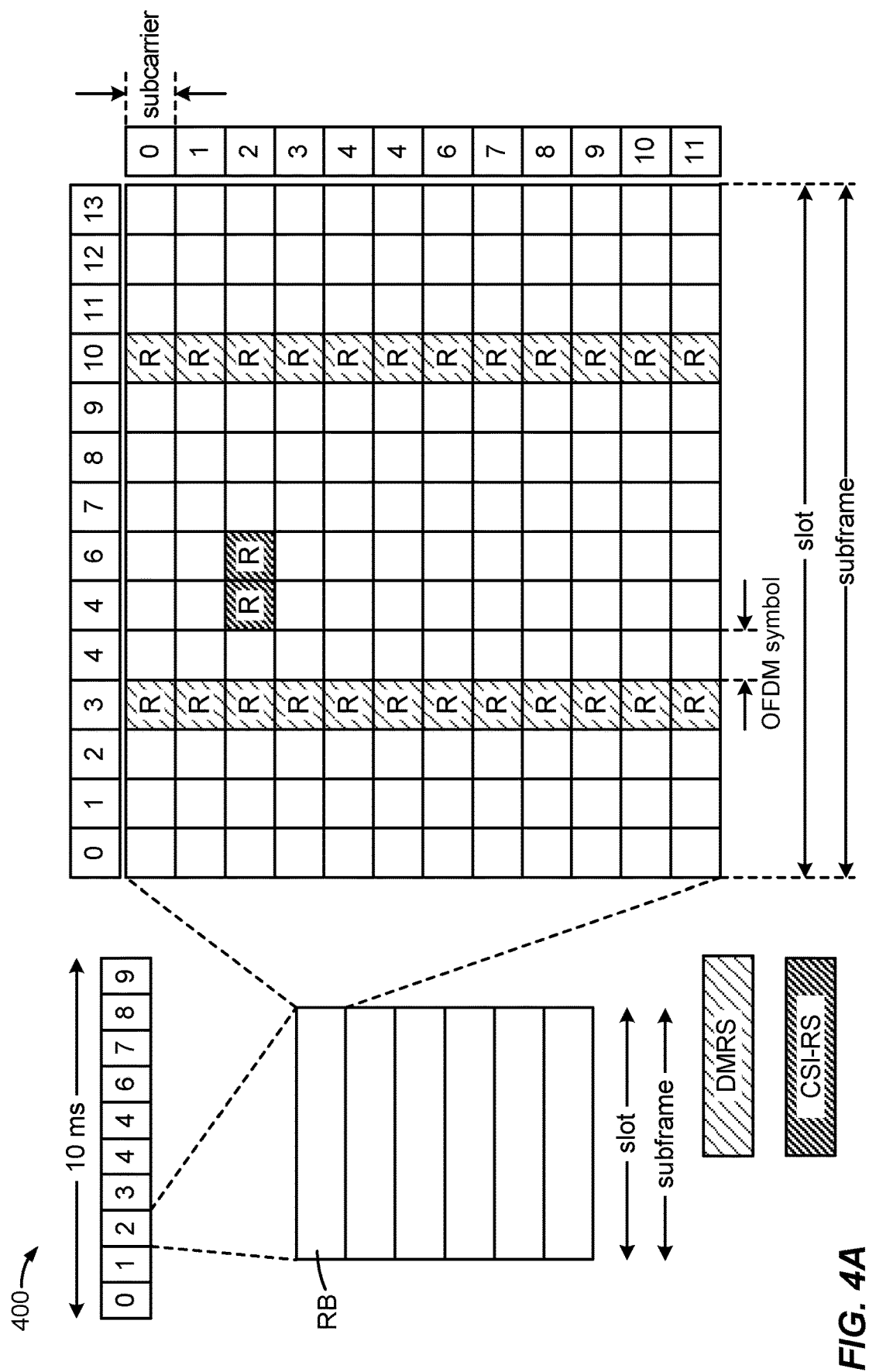
FIGS. 4A and 4B are diagrams illustrating examples of frame structures and channels within the frame structures, according to aspects of the disclosure.
Figure 4B:
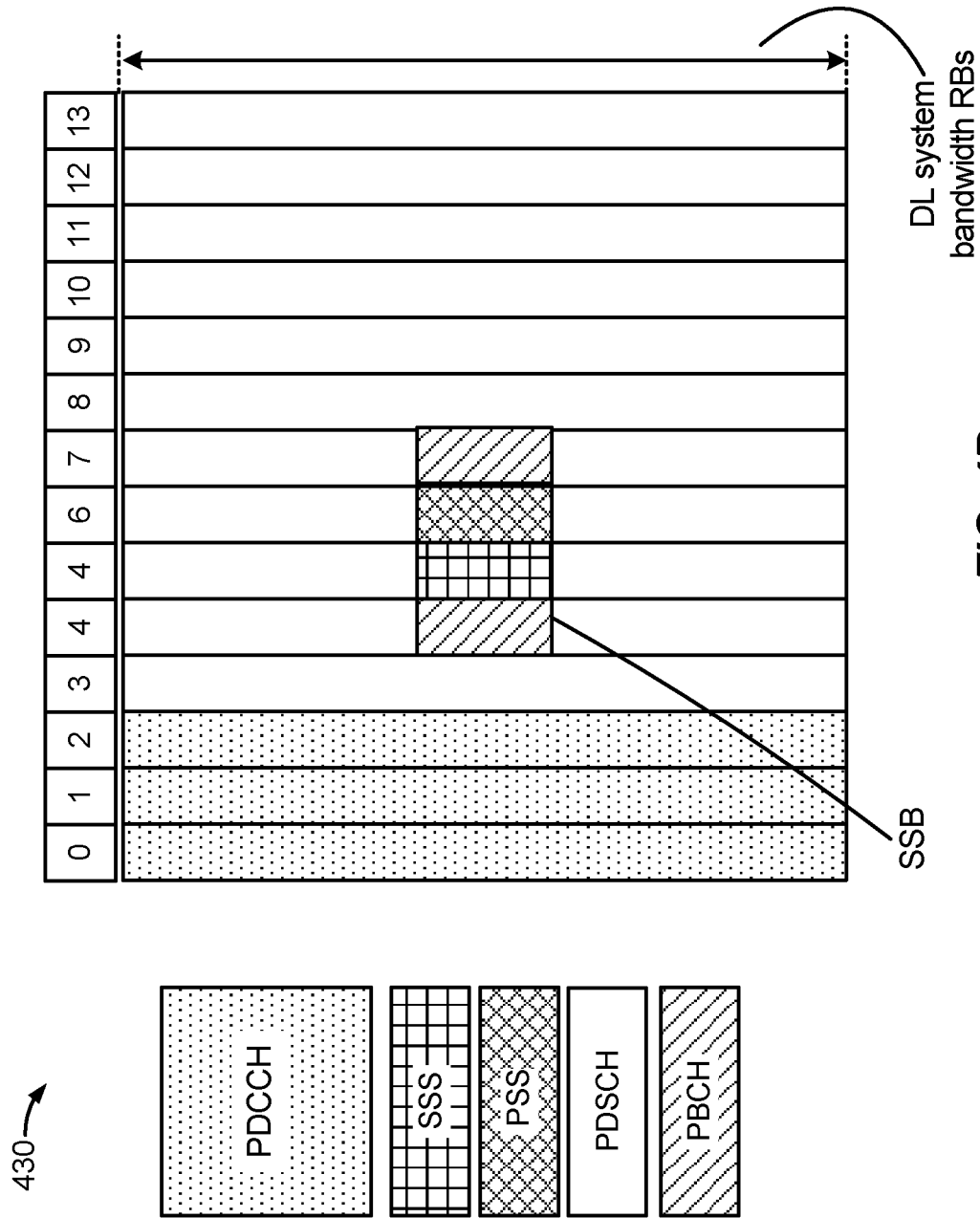

FIG. 4A is a diagram 400 illustrating an example of a DL frame structure, according to aspects of the disclosure. FIG. 4B is a diagram 430 illustrating an example of channels within the DL frame structure, according to aspects of the disclosure. Other wireless communications technologies may have a different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast NR may support multiple numerologies, for example, subcarrier spacing of 15 kHz, 30 kHz, 60 kHz, 120 kHz and 204 kHz or greater may be available. Table 1 provided below lists some various parameters for different NR numerologies.

TABLE 1

| Subcarrier spacing (kHz) | Symbols/ slot | slots/ subframe | slots/ frame | slot (ms) | Symbol duration (μs) | Max. nominal system BW (MHz) with 4K FFT size |
| --- | --- | --- | --- | --- | --- | --- |
| 15 | 14 | 1 | 10 | 1 | 66.7 | 50 |
| 30 | 14 | 2 | 20 | 0.5 | 33.3 | 100 |
| 60 | 14 | 4 | 40 | 0.25 | 16.7 | 100 |
| 120 | 14 | 8 | 80 | 0.125 | 8.33 | 400 |
| 240 | 14 | 16 | 160 | 0.0625 | 4.17 | 800 |

In the examples of FIGS. 4A and 4B, a numerology of 15 kHz is used. Thus, in the time domain, a frame (e.g., 10 ms) is divided into 10 equally sized subframes of 1 ms each, and each subframe includes one time slot. In FIGS. 4A and 4B, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A and 4B, for a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 4A, some of the REs carry DL reference (pilot) signals (DL-RS) for channel estimation at the UE. The DL-RS may include demodulation reference signals (DMRS) and channel state information reference signals (CSI-RS), exemplary locations of which are labeled "R" in FIG. 4A.

FIG. 4B illustrates an example of various channels within a DL subframe of a frame. The physical downlink control channel (PDCCH) carries DL control information (DCI) within one or more control channel elements (CCEs), each CCE including nine RE groups (REGs), each REG including four consecutive REs in an OFDM symbol. The DCI carries information about UL resource allocation (persistent and non-persistent) and descriptions about DL data transmitted to the UE. Multiple (e.g., up to 8) DCIs can be configured in the PDCCH, and these DCIs can have one of multiple formats. For example, there are different DCI formats for UL scheduling, for non-MIMO DL scheduling, for MIMO DL scheduling, and for UL power control.

A primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the DL system bandwidth and a system frame number (SFN). The physical downlink shared channel (PDSCH) carries user data, broadcast system information not transmitted through the PBCH such as system information blocks (SIBs), and paging messages.

Figure 5:
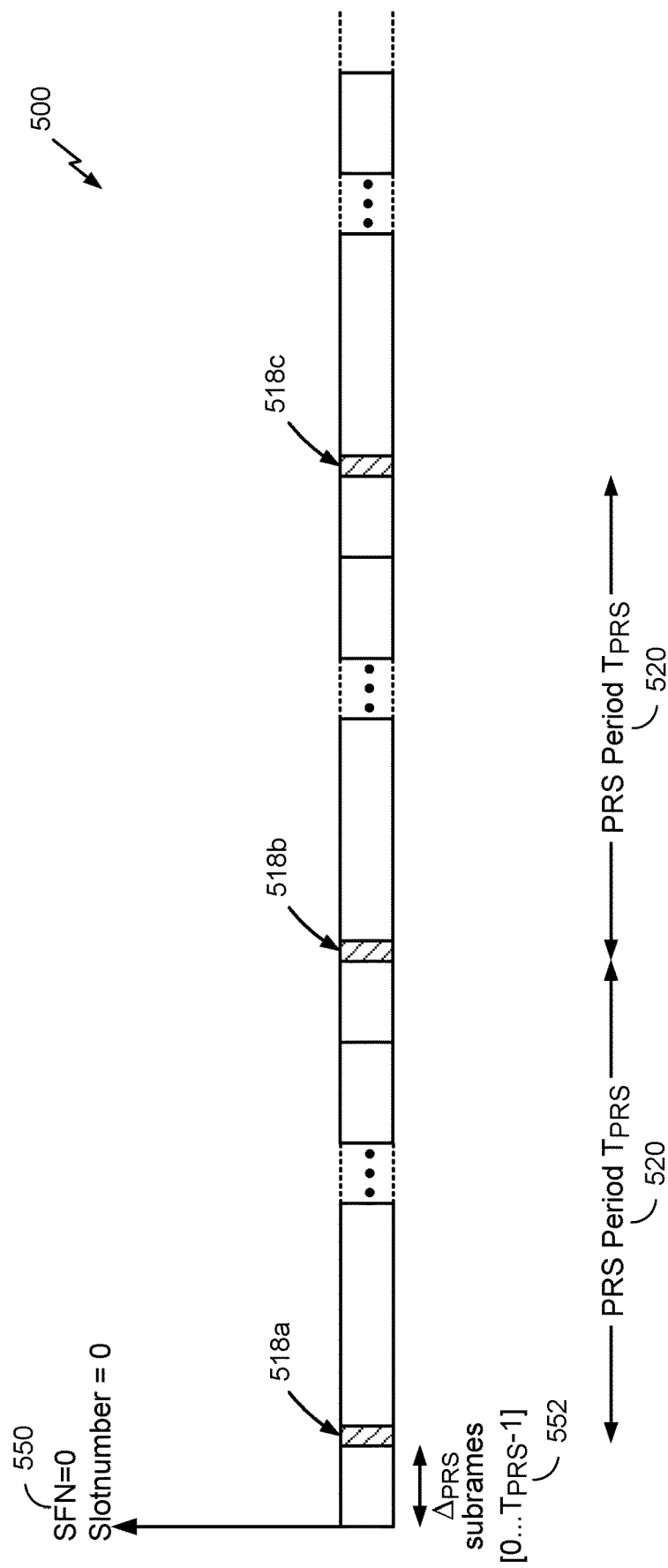
FIG. 5 illustrates an exemplary PRS configuration for a cell supported by a wireless node.

In some cases, the DL RS illustrated in FIG. 4A may be positioning reference signals (PRS). FIG. 5 illustrates an exemplary PRS configuration 500 for a cell supported by a wireless node (such as a base station 102). FIG. 5 shows how PRS positioning occasions are determined by a system frame number (SFN), a cell specific subframe offset ($\Delta_{PRS}$) 552, and the PRS periodicity ($T_{PRS}$) 520. Typically, the cell specific PRS ubframe configuration is defined by a "PRS Configuration Index" $I_{PRS}$ included in observed time difference of arrival (OTDOA) assistance data. The PRS periodicity ($T_{PRS}$) 520 and the cell specific subframe offset ($\Delta_{PRS}$) are defined based on the PRS configuration index $I_{PRS}$, as illustrated in Table 2 below.

TABLE 2

| PRS configuration Index $I_{PRS}$ | PRS periodicity $T_{PRS}$ (subframes) | PRS subframe offset $\Delta_{PRS}$ (subframes) |
| --- | --- | --- |
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-2404 | 5 | $I_{PRS}$-2400 |
| 2405-2414 | 10 | $I_{PRS}$-2405 |
| 2415-2434 | 20 | $I_{PRS}$-2415 |
| 2435-2474 | 40 | $I_{PRS}$-2435 |
| 2475-2554 | 80 | $I_{PRS}$-2475 |
| 2555-4095 | | Reserved |

A PRS configuration is defined with reference to the SFN of a cell that transmits PRS. PRS instances, for the first subframe of the $N_{PRS}$ downlink subframes comprising a first PRS positioning occasion, may satisfy:

$$(10 \times n_f + \lfloor n_s/2 \rfloor - \Delta_{PRS}) \bmod T_{PRS} = 0,$$

where $n_f$ is the SFN with $0 \leq n_f \leq 1023$, $n_s$ is the slot number within the radio frame defined by $n_f$ with $0 \leq n_s \leq 19$, $T_{PRS}$ is the PRS periodicity 520, and $\Delta_{PRS}$ is the cell-specific subframe offset 552.

As shown in FIG. 5, the cell specific subframe offset $\Delta_{PRS}$ 552 may be defined in terms of the number of subframes transmitted starting from system frame number 0 (Slot 'Number 0', marked as slot 550) to the start of the first (subsequent) PRS positioning occasion. In the example in FIG. 5, the number of consecutive positioning subframes ($N_{PRS}$) in each of the consecutive PRS positioning occasions 518a, 518b, and 518c equals 4. That is, each shaded block representing PRS positioning occasions 518a, 518b, and 518c represents four subframes.

In some aspects, when a UE receives a PRS configuration index $I_{PRS}$ in the OTDOA assistance data for a particular cell, the UE may determine the PRS periodicity $T_{PRS}$ 520 and PRS subframe offset $\Delta_{PRS}$ using Table 2. The UE may then determine the radio frame, subframe, and slot when a PRS is scheduled in the cell (e.g., using equation (1)). The OTDOA assistance data may be determined by, for example, the location server (e.g., location server 230, LMF 270), and includes assistance data for a reference cell, and a number of neighbor cells supported by various base stations.

Typically, PRS occasions from all cells in a network that use the same frequency are aligned in time and may have a fixed known time offset (e.g., cell-specific subframe offset 552) relative to other cells in the network that use a different frequency. In SFN-synchronous networks, all wireless nodes (e.g., base stations 102) may be aligned on both frame boundary and system frame number. Therefore, in SFN-synchronous networks, all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time.

A UE may determine the timing of the PRS occasions of the reference and neighbor cells for OTDOA positioning, if the UE can obtain the cell timing (e.g., SFN) of at least one of the cells, e.g., the reference cell or a serving cell. The timing of the other cells may then be derived by the UE based, for example, on the assumption that PRS occasions from different cells overlap.

3GPP Rel. 16 introduced various NR positioning aspects directed to increase location accuracy of positioning schemes that involve measurement(s) associated with one or more UL or DL PRSs (e.g., higher bandwidth (BW), FR2 beam-sweeping, angle-based measurements such as Angle of Arrival (AoA) and Angle of Departure (AoD) measurements, multi-cell Round-Trip Time (RTT) measurements, etc.). If latency reduction is a priority, then UE-based positioning techniques (e.g., DL-only techniques without UL location measurement reporting) are typically used. However, if latency is less of a concern, then UE-assisted positioning techniques can be used, whereby UE-measured data is reported to a network entity (e.g., location server 230, LMF 270, etc.). Latency associated UE-assisted positioning techniques can be reduced somewhat by implementing the LMF in the RAN.

Layer-3 (L3) signaling (e.g., RRC or Location Positioning Protocol (LPP)) is typically used to transport reports that comprise location-based data in association with UE-assisted positioning techniques. L3 signaling is associated with relatively high latency (e.g., above 100 ms) compared with Layer-1 (L1, or PHY layer) signaling or Layer-2 (L2, or MAC layer) signaling. In some cases, lower latency (e.g., less than 100 ms, less than 10 ms, etc.) between the UE and the RAN for location-based reporting may be desired. In such cases, L3 signaling may not be capable of reaching these lower latency levels.

Embodiments of the disclosure are directed to location reporting aspects that that facilitate over-the-air transport efficiencies. The various location reporting aspects described below may be utilized with respect to L1, L2 or L3 signaling.

Figure 6:
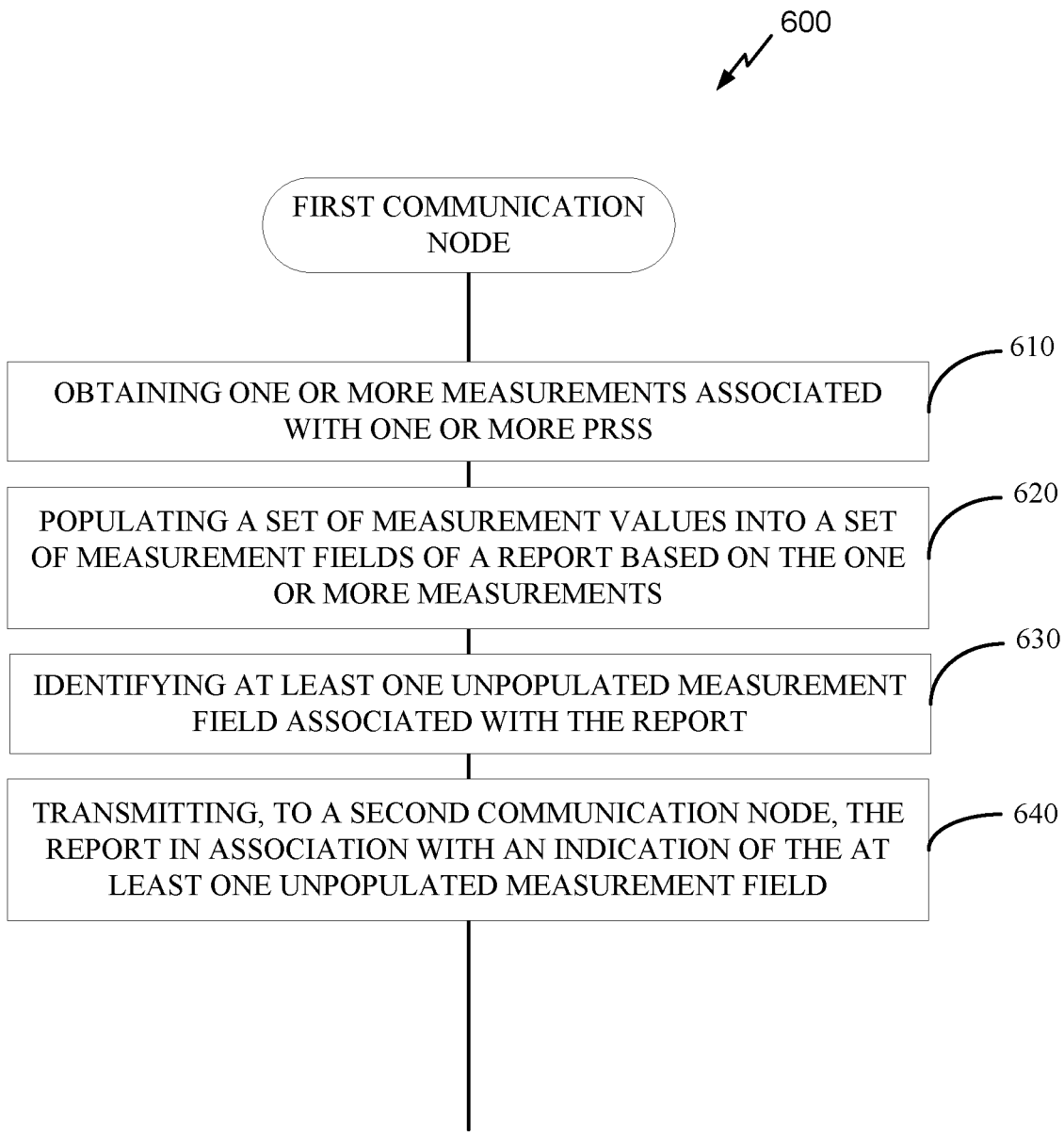
FIGS. 6 and 7 illustrate methods of wireless communication, according to aspects of the disclosure.

FIG. 6 illustrates an exemplary process 600 of wireless communication, according to aspects of the disclosure. In an aspect, the process 600 may be performed by a first communication node. In some implementations, the first communication may correspond to a UE (e.g., in a scenario where the UE is measuring DL PRS(s) and reporting to a base station) or a BS (e.g., in a scenario where the BS is measuring UL PRS(s) and reporting to a UE).

At 610, the first communication node obtains one or more measurements associated with one or more PRSs (e.g., one or more UL PRSs, one or more DL PRSs, etc.). As will be discussed below in more detail, the one or more measurements can be obtained directly (e.g., via direct measurement at the first communication node) or indirectly (e.g., via an external entity that performs the measurement(s) and then relays measurement data to the first communication node). In an aspect, operation 610 may be performed by receiver(s) 312, WWAN transceiver 310, processing system 332, memory 340, PRS measurement module 342, sensor(s) 344, receiver(s) 352, WWAN transceiver 350, processing system 384, memory 386, PRS measurement module 388, etc.

At 620, the first communication node populates a set of measurement values into a set of measurement fields of a report based on the one or more measurements. In an example, the set of measurement values that are populated into the set of measurement fields may be selected based on a variety of factors, such as measurement-specific quality (e.g., if a threshold confidence or accuracy is reached for a particular measurement, populate that measurement in a corresponding field of the report) and/or based on one or more sub-report concatenation rules that will be described below in more detail. In an aspect, operation 620 may be performed by, processing system 332, memory 340, PRS measurement module 342, processing system 384, memory 386, PRS measurement module 388, etc.

At 630, the first communication node identifies at least one unpopulated measurement field associated with the report. In an example, the at least one unpopulated measurement field may be 'blanked' (e.g., filled with dummy data or a predetermined bit sequence that is will be recognized by the second communication node as an implicit unpopulated status for that field). In an alternative example, the at least one unpopulated measurement field may be omitted entirely (as opposed to being filled with non-measurement bits). In some designs, the identification of the at least one unpopulated measurement field may be based on a variety of factors, such as measurement-specific quality (e.g., if a threshold confidence or accuracy is not reached for a particular measurement, leave a corresponding field for that measurement unpopulated in the report) and/or based on one or more sub-report concatenation rules that will be described below in more detail. In an aspect, operation 630 may be performed by, processing system 332, memory 340, PRS measurement module 342, processing system 384, memory 386, PRS measurement module 388, etc.

At 640, the first communication node transmits, to a second communication node, the report in association with an indication of the at least one unpopulated measurement field. In some designs, the report itself is configured to provide the indication (e.g., via a bit configuration of the report that specifies a particular report format, or by setting particular report fields to predetermined bit configurations so as to convey that those fields are not populated with measurement data, i.e., 'blanking', etc.). In other designs, the indication of the at least one unpopulated measurement field may be transmitted separately from the report. In an aspect, operation 640 may be performed by transmitter(s) 314, WWAN transceiver 310, processing system 332, memory 340, PRS measurement module 342, transmitter(s) 354, WWAN transceiver 350, processing system 384, memory 386, PRS measurement module 388, etc.

Figure 7:
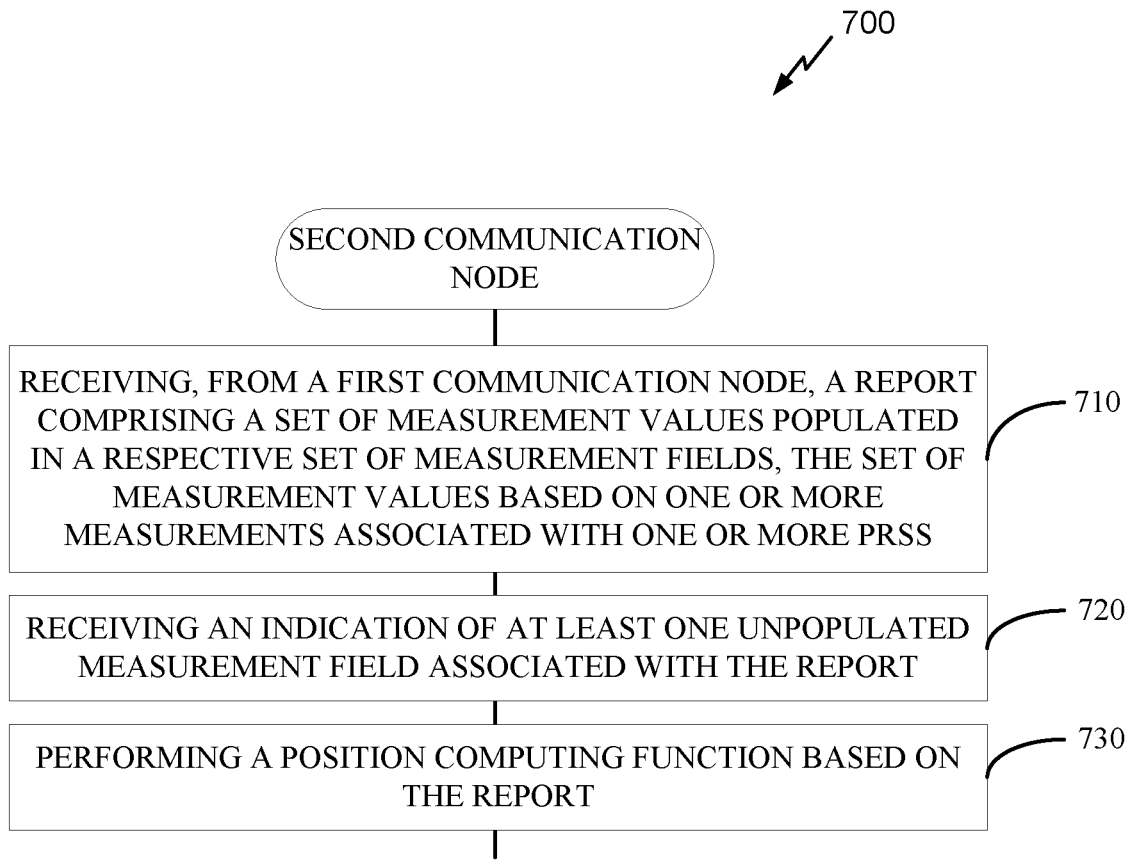

FIG. 7 illustrates an exemplary process 700 of wireless communication, according to aspects of the disclosure. In an aspect, the process 700 may be performed by a second communication node. In some implementations, the second communication may correspond to a UE (e.g., in a scenario where the BS is measuring UL PRS(s) and reporting to the UE, or in a scenario where the UE is measuring DL PRS(s) and reporting to a sidelink (SL) UE that is performing a position computing function on behalf of the UE) or a BS (e.g., in a scenario where the UE is measuring DL PRS(s) and reporting to the BS).

At 710, the second communication node receives, from a first communication node, a report comprising a set of measurement values populated in a respective set of measurement fields, the set of measurement values based on one or more measurements associated with one or more PRSs. For example, operation 710 may correspond to receipt of the report transmitted at operation 640 as described above with respect to FIG. 6. In an aspect, operation 710 may be performed by receiver(s) 312, WWAN transceiver 310, processing system 332, memory 340, PRS measurement module 342, receiver(s) 352, WWAN transceiver 350, processing system 384, memory 386, PRS measurement module 388, etc.

At 720, the second communication node receives an indication of at least one unpopulated measurement field associated with the report. As noted above with respect to operation 640, in some designs, the report itself is configured to provide the indication (e.g., via a bit configuration or index that specifies a particular report format for the report, or by setting particular report fields to predetermined bit configurations so as to convey that those fields are not populated with measurement data, i.e., 'blanking', etc.). In other designs, the indication of the at least one unpopulated measurement field may be received separately from the report. In an aspect, operation 720 may be performed by receiver(s) 312, WWAN transceiver 310, processing system 332, memory 340, PRS measurement module 342, receiver(s) 352, WWAN transceiver 350, processing system 384, memory 386, PRS measurement module 388, etc.

At 730, the second communication node performs a position computing function (e.g., LMF) based on the report. In an aspect, operation 720 may be performed by processing system 332, memory 340, processing system 384, memory 386, etc.

Referring to FIGS. 6-7, in some designs, the report at 640 and 710 may correspond to L1 signaling (e.g., an Uplink Control Information (UCI) communication or Downlink Control Information (DCI) communication), L2 signaling (e.g., a MAC Command Element (CE)), or L3 signaling (e.g., RRC/LPP signaling, as is used in some current systems to transport PRS-related reports).

Referring to FIGS. 6-7, the set of measurement values may be associated with one or more of a difference of arrival (TDOA) measurement, a Reference Signal Receive Power (RSRP) measurement, an Angle of Arrival (AoA) measurement, an Angle of Departure (AoD) measurement, a motion state measurement, a trajectory measurement, a report quality indication, a receive-transmit (Rx-Tx) measurement (e.g., to facilitate a Round-Trip Time (RTT) calculation), or any combination thereof.

Referring to FIGS. 6-7, in some designs, the report at 640 and 710 may be generated as a concatenation of measurement information from multiple sub-reports in accordance with at least one sub-report concatenation rule. In an example, the at least one sub-report concatenation rule comprises one or more of:
 concatenating measurement information from the multiple sub-reports on a per-cell (or per-TRP) basis (e.g., RSRP measurement information),
 concatenating measurement information from the multiple sub-reports that is common across multiple cells associated with the same transmission reception point (TRP) (e.g., a single TOA measurement using PRS sticking across cells),
 concatenating measurement information from the multiple sub-reports associated with multiple PRSs (e.g., from the same cell or TRP, from different cells or TRPs, etc.),
 concatenating measurement information from the multiple sub-reports associated with disparate measurement types (e.g., TDOA, AoA, etc.),
 concatenating measurement information from the multiple sub-reports that is associated with different TRPs,
 concatenating measurement information from the multiple sub-reports that is associated with different report transmission triggers (e.g., different periodicities, such as an aperiodic (A) sub-report, a semi-persistent (SP) report, a periodic (P) report, etc.),
 concatenating UE-local measurement information (e.g., motion-state, trajectory, mobility information, etc.),
 concatenating measurement information from the multiple sub-reports in accordance with a concatenation order based on one or more criteria (e.g., higher-priority measurement information arranged earlier in the report relative to lower-priority measurement information),
 concatenating measurement information from the multiple sub-reports based on measurement type such that only measurement information from one measurement type is concatenated into the report (e.g., RSRP only, AoA only, etc.),
 concatenating measurement information from the multiple sub-reports based on measurement type groupings such that only measurement information from one measurement type group is concatenated into the report (e.g., RSRP and AoA only, any measurement type except RSRP, etc.), or
 any combination thereof.

As an example, the processing of the at least one sub-report concatenation rule may correspond to operations 620-630, such that measurement information concatenated into the report corresponds to the set of measurement values populated into the set of measurement fields, whereas measurement information excluded from the concatenation into the report corresponds to the least one unpopulated measurement field.

Referring to FIGS. 6-7, in some designs, the multiple sub-reports that contribute measurement information that is concatenated into the report at 640 and 710 may comprise measurement information associated with a single cell, measurement information associated with multiple cells, measurement information associated with at least one sidelink, or any combination thereof.

Referring to FIGS. 6-7, in some designs, the report at 640 and 710 may comprise measurement information associated with two or more measurement types (e.g., RSRP and AoA, etc.). In some designs, some part of measurement information from the one or more measurements is omitted from the report in association with at least one cell (e.g., measurement information that is redundant with other measurement data in the report and/or measurement information that is associated with a low confidence level or low accuracy, etc.).

Referring to FIGS. 6-7, in some designs, the report at 640 and 710 may have a fixed size. In other designs, the report at 640 and 710 may have a variable size dependent on (e.g., that scales with) an amount of measurement information concatenated into the report. In some designs, different sets of sub-report types may be concatenated separately from each other, such that each set of sub-report types is encoded differently. For example, a first sub-report type concatenation group may comprise TDOA sub-reports, and a second sub-report type concatenation group may comprise RSRP sub-reports. In an example, the particular groupings of sub-report types that are concatenated together for common encoding can be based on one or more of the sub-report concatenation rules noted above. In an example, a first sub-report type concatenation group may have a preconfigured size (e.g., similar to CSI part 1), while a second sub-report type concatenation group may have a variable or dynamic size (e.g., similar to CSI part 2).

Referring to FIGS. 6-7, in some designs, the encoding and concatenation of the report may be performed in any order. In an example, the encoding could be after all the concatenation. In an L1-specific example, the sub-reports can be grouped and then concatenated, sent to separate encoder, and the encoded outputs can then be multiplexed onto the L1 channel.

Referring to FIGS. 6-7, as noted above, the unpopulated measurement field may be included in the report, but may be 'blanked' (e.g., filled with dummy data or a predetermined bit sequence that is will be recognized by the second communication node as an implicit unpopulated status for that field). For example, the dummy data may be a string of 0s, a string of 1s, or some other bit sequence that is configured to be recognized as not corresponding to actual measurement data for an associated measurement field. In an alternative example, the at least one unpopulated measurement field may be omitted entirely (as opposed to being filled with non-measurement bits).

In some designs, a first unpopulated measurement field associated with the report may be blanked while a second unpopulated measurement field associated with the report may be omitted. In some designs, the decision of whether to blank or omit an unpopulated measurement field from the report can be based on a size of the unpopulated measurement field (e.g., blank unpopulated measurement fields that are less than a size threshold, and omit blank unpopulated measurement fields that are not less than a size threshold).

In some designs, the indication at operation 640 and 720 may expressly identify the at least one unpopulated measurement field. For example, the express indication may correspond to the at least one unpopulated measurement field being set to a pre-defined bit configuration (e.g., blanked) within the report. In another example, the indication identifies one of a plurality of report formats that are each associated with different combination of measurement fields, where the identified report format is associated with the at least one unpopulated measurement field. So, an index value can be conveyed that identifies the field(s) which are not populated in the report (i.e., express indication of such field(s)). In some designs, two or more of the plurality of report formats are associated with different report sizes (e.g., particularly, report formats with less populated measurement field(s) will generally be smaller than report formats with more populated measurement field(s), unless there is a high variance in terms of field size).

In other designs, the indication at operation 640 and 720 may implicitly identify the at least one unpopulated measurement field. For example, the implicit indication may identify one of a plurality of report formats that are each associated with different combination of measurement fields, where the identified report format is associated with the set of populated measurement fields. So, an index value can be conveyed that identifies the field(s) which are populated in the report (i.e., implicit indication of the unpopulated field(s)). In some designs, two or more of the plurality of report formats are associated with different report sizes (e.g., particularly, report formats with less populated measurement field(s) will generally be smaller than report formats with more populated measurement field(s), unless there is a high variance in terms of field size).

Referring to FIGS. 6-7, in some designs, the report at 640 and 710 may comprise a standalone measurement value for at least one particular measurement. As used herein, a standalone measurement value is an absolute or independent value that is not relative to another measurement value. In some designs, for at least one particular measurement, the report at 640 and 710 may comprise a differential measurement value that is relative to a standalone measurement value included in the report or included in a different report. For example, a particular measurement type may be made with respect to multiple cells. In this case, as an example, one standalone measurement value for one of the multiple cells may be paired with differential measurement value(s) of one or more other cell(s) among the multiple cells in the same report. In another example, a particular measurement type (e.g., trajectory) may be tracked over time. In this case, as an example, a differential measurement value may be relative to a standalone measurement value (e.g., directly relative, or indirectly relative via one or more 'intervening' differential measurement values) taken earlier in time. Even though the standalone measurement value is earlier in time relative to the differential measurement value, the earlier standalone measurement value may part of either an earlier report or even the same report at 640 and 710. In another example, a differential measurement value may be relative to a standalone measurement value of the same type in the same report (e.g., one standalone RSRP measurement, with one or more differential RSRP measurements relative to the standalone RSRP measurement irrespective of whether that RSRP measurement is associated with the same signal, the same time, etc.).

Referring to FIGS. 6-7, in some designs, in context with a differential reporting scheme, the standalone measurement value to which one or more differential measurement values are associated may correspond to a maximum value or a minimum value (e.g., an earliest delay, a strongest path, etc.). Moreover, when multiple measurement values are reported for the same measurement type, the multiple measurement values may be sorted in the report in accordance with defined sort order in some designs. For example, if multiple differential measurement values are sorted together in the report, then the multiple differential measurement values may implicitly be associated with the same reference standalone measurement value. Alternatively, a standalone measurement value may be implicitly indicated by a structure of the report. Alternatively, a standalone measurement value associated with differential measurement value(s) may be expressly indicated in the report.

While some examples of the report at 640 and 710 are provided with reference to L1-specific aspects, the report at 620 and 710 may also be implemented via L2 signaling (e.g., MAC-CE) or L3 signaling (e.g., RRC/LLP signaling) as noted above. In L2 (MAC-CE), there is no separate encoding analogous to the L1 case (e.g., CSI parts 1-2). However, there is still code block (CB)/code block group (CBG) partitioning, which may be viewed as a form of separate encoding (e.g., the partitioning is decoupled from the information content of an associated packet). In this case, indications that specify which CBGs carry which specific MAC-CEs may be leveraged to transport the report at 640 and 710. In L3 (e.g., RRL/LLP), the RRC/LPP signaling may be configured similarly to existing standards, except that the indication of the at least one unpopulated measurement field is conveyed so as to increase the transport efficiency of the RRC/LPP signaling and/or to control which measurement data is conveyed via such signaling (e.g., via blanking, etc.).

While some examples of the report at 640 and 710 are provided where the first communication node corresponds to a UE and the second communication node corresponds to a BS, in other designs, the communication node may correspond to a BS and the second communication node may correspond to a UE. For example, a UE-based positioning scheme could be augmented whereby the BS (or RAN) conveys measurement information to the UE via the report at 640 and 710 (e.g., eNB reports Rx-Tx to UE, to allow UE to compute RTT-based position). Such reports may also include measurement information associated with multiple cells and/or sidelink UEs (e.g., serving cell collects measurements and/or calculated positions from these external devices, and then relays this information to the UE via the report at 640 and 710). In an L1-specific example, new DCI formats may be defined to transport the report at 640 and 710 so that this report may be monitored via an existing RNTI or a new positioning-specific RNTI (e.g., which can be defined in standard). In a scenario where the BS is the first communication node, the 'separate encoding' aspects (e.g., different concatenation sub-report groups being encoded differently) need not apply (e.g., for MAC-CE, CBGs may be used for DL MAC-CEs similar to UL MAC-CEs as noted above, and for DCI, a multi-stage DCI approach could be used).

Referring to FIG. 6, in some designs, the second communication node may correspond to an SL UE that is acting as a relay to a base station.

Referring to FIGS. 6-7, in some designs, the first communication node may be a UE attempting to determine its location and the second communication node may correspond to an SL UE that is performing a position computing function on behalf of the UE (e.g., such that a BS or WWAN need not be part of the position fix). In this scenario, in an example, a MAC-CE or DL L1 Sidelink Control Information (SCI) (instead of DCI) may be used for the report at 640 and 710 (rather than the UL L1 approach described above). For example, such an approach could help to avoid a new decoder implementation for 'UCI-over-PUSCH/PUCCH' transmission types at the SL UE. A similar approach was also followed for CSI reporting in SL for 3GPP Rel. 16 V2X (using MAC-CE).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a first communication node, comprising:
   obtaining one or more measurements associated with one or more positioning reference signals (PRSs);
   populating a set of measurement values into a set of measurement fields of a report based on the one or more measurements;
   identifying at least one unpopulated measurement field associated with the report; and
   transmitting, to a second communication node, the report in association with an indication of the at least one unpopulated measurement field,
   wherein the indication corresponds to the at least one unpopulated measurement field being set to a pre-defined bit configuration within the report, or
   wherein the indication identifies one of a plurality of report formats that are each associated with different combination of measurement fields, and the identified report format is associated with the at least one unpopulated measurement field.

2. The method of claim 1, wherein the at least one unpopulated measurement field is blanked in the report or is omitted from the report altogether.

3. The method of claim 1, wherein the indication expressly identifies the at least one unpopulated measurement field.

4. The method of claim 1,
   wherein the indication corresponds to the at least one unpopulated measurement field being set to the pre-defined bit configuration within the report.

5. The method of claim 1, wherein the indication implicitly identifies the at least one unpopulated measurement field.

6. The method of claim 1,
   wherein the indication identifies the one of the plurality of report formats.

7. The method of claim 6, wherein two or more of the plurality of report formats are associated with different report sizes.

8. The method of claim 1,
   wherein the set of measurement values is associated with a single cell, or
   wherein the set of measurement values is associated with a plurality of cells.

9. The method of claim 1, wherein the set of measurement values comprises a standalone measurement value.

10. The method of claim 1, wherein the set of measurement values comprises a differential measurement value that is relative to a standalone measurement value included in the report or included in a different report.

11. The method of claim 1, wherein the report is transmitted via L1, L2 or L3 signaling.

12. The method of claim 1,
    wherein the first communication node corresponds to a user equipment (UE), or
    wherein the first communication node corresponds to a network component.

13. The method of claim 1,
    wherein the second communication node corresponds to a user equipment (UE), or
    wherein the second communication node corresponds to a network component, or
    wherein the second communication node corresponds to a sidelink UE performing the position computing function on behalf of another UE.

14. A method of operating a second communication node, comprising:
    receiving, from a first communication node, a report comprising a set of measurement values populated in a respective set of measurement fields, the set of measurement values based on one or more measurements associated with one or more positioning reference signals (PRSs);
    receiving an indication of at least one unpopulated measurement field associated with the report; and
    performing a position computing function based on the report,
    wherein the indication corresponds to the at least one unpopulated measurement field being set to a pre-defined bit configuration within the report, or
    wherein the indication identifies one of a plurality of report formats that are each associated with different combination of measurement fields, and the identified report format is associated with the at least one unpopulated measurement field.

15. The method of claim 14, wherein the at least one unpopulated measurement field is blanked in the report or is omitted from the report altogether.

16. The method of claim 14, wherein the indication expressly identifies the at least one unpopulated measurement field.

17. The method of claim 14, wherein the indication corresponds to the at least one unpopulated measurement field being set to the pre-defined bit configuration within the report.

18. The method of claim 14, wherein the indication implicitly identifies the at least one unpopulated measurement field.

19. The method of claim 14,
    wherein the indication identifies the one of the plurality of report formats.

20. The method of claim 19, wherein two or more of the plurality of report formats are associated with different report sizes.

21. The method of claim 14,
    wherein the set of measurement values is associated with a single cell, or
    wherein the set of measurement values is associated with a plurality of cells.

22. The method of claim 14, wherein the set of measurement values comprises a standalone measurement value.

23. The method of claim 14, wherein the set of measurement values comprises a differential measurement value that is relative to a standalone measurement value included in the report or included in a different report.

24. The method of claim 14, wherein the report is received via L1, L2 or L3 signaling.

25. The method of claim 14,
    wherein the first communication node corresponds to a user equipment (UE), or
    wherein the first communication node corresponds to a network component.

26. The method of claim 14,
wherein the second communication node corresponds to a user equipment (UE), or
wherein the second communication node corresponds to a network component.

27. A first communication node, comprising:
a memory;
at least one transceiver; and
at least one processor communicatively coupled to the memory and the at least one transceiver, the at least one processor configured to:
  obtain one or more measurements associated with one or more positioning reference signals (PRSs);
  populate a set of measurement values into a set of measurement fields of a report based on the one or more measurements;
  identify at least one unpopulated measurement field associated with the report; and
transmit, to a second communication node, the report in association with an indication of the at least one unpopulated measurement field,
wherein the indication corresponds to the at least one unpopulated measurement field being set to a pre-defined bit configuration within the report, or
wherein the indication identifies one of a plurality of report formats that are each associated with different combination of measurement fields, and the identified report format is associated with the at least one unpopulated measurement field.

28. The first communication node of claim 27,
wherein the first communication node corresponds to a user equipment (UE), or
wherein the first communication node corresponds to a network component.

29. The first communication node of claim 27,
wherein the second communication node corresponds to a user equipment (UE), or
wherein the second communication node corresponds to a network component, or
wherein the second communication node corresponds to a sidelink UE performing the position computing function on behalf of another UE.

30. A second communication node, comprising:
a memory;
at least one transceiver; and
at least one processor communicatively coupled to the memory and the at least one transceiver, the at least one processor configured to:
  receive, from a first communication node, a report comprising a set of measurement values populated in a respective set of measurement fields, the set of measurement values based on one or more measurements associated with one or more positioning reference signals (PRSs);
  receive an indication of at least one unpopulated measurement field associated with the report; and
perform a position computing function based on the report,
wherein the indication corresponds to the at least one unpopulated measurement field being set to a pre-defined bit configuration within the report, or
wherein the indication identifies one of a plurality of report formats that are each associated with different combination of measurement fields, and the identified report format is associated with the at least one unpopulated measurement field.

31. The second communication node of claim 30,
wherein the first communication node corresponds to a user equipment (UE), or
wherein the first communication node corresponds to a network component.

32. The second communication node of claim 30,
wherein the second communication node corresponds to a user equipment (UE), or
wherein the second communication node corresponds to a network component.

33. A first communication node, comprising:
means for obtaining one or more measurements associated with one or more positioning reference signals (PRSs);
means for populating a set of measurement values into a set of measurement fields of a report based on the one or more measurements;
means for identifying at least one unpopulated measurement field associated with the report; and
means for transmitting, to a second communication node, the report in association with an indication of the at least one unpopulated measurement field,
wherein the indication corresponds to the at least one unpopulated measurement field being set to a pre-defined bit configuration within the report, or
wherein the indication identifies one of a plurality of report formats that are each associated with different combination of measurement fields, and the identified report format is associated with the at least one unpopulated measurement field.

34. The first communication node of claim 33,
wherein the first communication node corresponds to a user equipment (UE), or
wherein the first communication node corresponds to a network component.

35. The first communication node of claim 33,
wherein the second communication node corresponds to a user equipment (UE), or
wherein the second communication node corresponds to a network component, or
wherein the second communication node corresponds to a sidelink UE performing the position computing function on behalf of another UE.

36. A second communication node, comprising:
means for receiving, from a first communication node, a report comprising a set of measurement values populated in a respective set of measurement fields, the set of measurement values based on one or more measurements associated with one or more positioning reference signals (PRSs);
means for receiving an indication of at least one unpopulated measurement field associated with the report; and
means for performing a position computing function based on the report,
wherein the indication corresponds to the at least one unpopulated measurement field being set to a pre-defined bit configuration within the report, or
wherein the indication identifies one of a plurality of report formats that are each associated with different combination of measurement fields, and the identified report format is associated with the at least one unpopulated measurement field.

37. The second communication node of claim 36,
wherein the first communication node corresponds to a user equipment (UE), or
wherein the first communication node corresponds to a network component.

38. The second communication node of claim 36,
wherein the second communication node corresponds to a user equipment (UE), or
wherein the second communication node corresponds to a network component.

39. A non-transitory computer-readable medium storing computer-executable instructions, the computer-executable instructions comprising:
at least one instruction instructing a first communication node to obtain one or more measurements associated with one or more positioning reference signals (PRSs);
at least one instruction instructing the first communication node to populate a set of measurement values into a set of measurement fields of a report based on the one or more measurements
at least one instruction instructing the first communication node to identify at least one unpopulated measurement field associated with the report; and
at least one instruction instructing the first communication node to transmit, to a second communication node, the report in association with an indication of the at least one unpopulated measurement field,
wherein the indication corresponds to the at least one unpopulated measurement field being set to a predefined bit configuration within the report, or
wherein the indication identifies one of a plurality of report formats that are each associated with different combination of measurement fields, and the identified report format is associated with the at least one unpopulated measurement field.

40. The non-transitory computer-readable medium of claim 39,
wherein the first communication node corresponds to a user equipment (UE), or
wherein the first communication node corresponds to a network component.

41. The non-transitory computer-readable medium of claim 39,
wherein the second communication node corresponds to a user equipment (UE), or
wherein the second communication node corresponds to a network component, or
wherein the second communication node corresponds to a sidelink UE performing the position computing function on behalf of another UE.

42. A non-transitory computer-readable medium storing computer-executable instructions, the computer-executable instructions comprising:
at least one instruction instructing a second communication node to receive, from a first communication node, a report comprising a set of measurement values populated in a respective set of measurement fields, the set of measurement values based on one or more measurements associated with one or more positioning reference signals (PRSs);
at least one instruction instructing the second communication node to receive an indication of at least one unpopulated measurement field associated with the report; and
at least one instruction instructing the second communication node to perform a position computing function based on the report,
wherein the indication corresponds to the at least one unpopulated measurement field being set to a predefined bit configuration within the report, or
wherein the indication identifies one of a plurality of report formats that are each associated with different combination of measurement fields, and the identified report format is associated with the at least one unpopulated measurement field.

43. The non-transitory computer-readable medium of claim 42,
wherein the first communication node corresponds to a user equipment (UE), or
wherein the first communication node corresponds to a network component.

44. The non-transitory computer-readable medium of claim 42,
wherein the second communication node corresponds to a user equipment (UE), or
wherein the second communication node corresponds to a network component.

* * * * *